US009005795B2

United States Patent
Park et al.

(10) Patent No.: US 9,005,795 B2
(45) Date of Patent: Apr. 14, 2015

(54) SEPARATOR HAVING POROUS COATING LAYER, MANUFACTURING METHOD OF THE SAME, AND ELECTROCHEMICAL DEVICE HAVING THE SAME

(75) Inventors: Pil-Kyu Park, Daejeon (KR); Jong-Hun Kim, Daejeon (KR); Jang-Hyuk Hong, Daejeon (KR); Byoung-Jin Shin, Daejeon (KR); In-Chul Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/060,530

(22) Filed: Feb. 24, 2011

(65) Prior Publication Data
US 2011/0305941 A1 Dec. 15, 2011

Related U.S. Application Data

(63) Continuation of application No. PCT/KR2009/004682, filed on Aug. 21, 2009.

(30) Foreign Application Priority Data

Aug. 25, 2008 (KR) .................... 10-2008-0082978

(51) Int. Cl.
| | | |
|---|---|---|
| H01M 2/14 | (2006.01) | |
| H01M 2/16 | (2006.01) | |
| H01M 6/14 | (2006.01) | |
| H01M 10/052 | (2010.01) | |

(52) U.S. Cl.
CPC ............ *H01M 2/162* (2013.01); *H01M 2/1646* (2013.01); *H01M 6/14* (2013.01); *H01M 10/052* (2013.01)

(58) Field of Classification Search
CPC .... H01M 2/145; H01M 2/162; H01M 2/1666
USPC .......................................................... 429/145
See application file for complete search history.

(56) References Cited

U.S. PATENT DOCUMENTS

| | | | |
|---|---|---|---|
| 7,923,143 B2 * | 4/2011 | Tanaka et al. ................. | 429/142 |
| 2005/0053840 A1 | 3/2005 | Jo et al. | |
| 2009/0067119 A1 | 3/2009 | Katayama et al. | |

FOREIGN PATENT DOCUMENTS

| | | |
|---|---|---|
| JP | 11-080395 A | 3/1999 |
| JP | 2001089967 A | 4/2001 |
| JP | 2003-288880 A | 10/2003 |
| JP | 2005536857 A | 12/2005 |
| JP | 2007-157723 A | 6/2007 |

(Continued)

*Primary Examiner* — Tracy Dove
(74) *Attorney, Agent, or Firm* — Lerner, David, Littenberg, Krumholz & Mentlik, LLP

(57) ABSTRACT

A separator includes a planar non-woven fabric substrate having a plurality of pores, and a porous coating layer provided on at least one surface of the non-woven fabric substrate and made of a mixture of a plurality of inorganic particles and a binder polymer, wherein the non-woven fabric substrate is made of superfine fibers having an average thickness of 0.5 to 10 μm, and wherein, among the pores in the non-woven fabric substrate, pores having a wide diameter of 0.1 to 70 μm are 50% or above of the entire pores. The above separator having the porous coating layer may generate the generation of leak current without increasing a loading weight of the porous coating layer since the non-woven fabric substrate having a controlled pore side by using superfine fibers of a predetermined thickness is used.

12 Claims, 5 Drawing Sheets

(56) References Cited

FOREIGN PATENT DOCUMENTS

| | | |
|---|---|---|
| JP | 2008-192483 A | 8/2008 |
| KR | 20050006540 A | 1/2005 |
| KR | 20070019958 A | 2/2007 |
| KR | 20070055979 A | 5/2007 |
| KR | 100775295 A | 8/2007 |
| KR | 100889207 A | 8/2007 |
| WO | 2004021476 A1 | 3/2004 |
| WO | 2005038960 A1 | 4/2005 |
| WO | 2006025662 A1 | 3/2006 |
| WO | 2007061269 A1 | 5/2007 |
| WO | 2007094641 A1 | 8/2007 |
| WO | 2008/038971 A1 | 4/2008 |
| WO | 2008097013 A1 | 8/2008 |

* cited by examiner

SEPARATOR HAVING POROUS COATING LAYER, MANUFACTURING METHOD OF THE SAME, AND ELECTROCHEMICAL DEVICE HAVING THE SAME

CROSS-REFERENCE TO RELATED APPLICATIONS

The present application is a continuation application of International Application No. PCT/KR2009/004682, filed Aug. 21, 2009, published in Korean, which claims priority from Korean Patent Application No. 10-2008-0082978, filed Aug. 25, 2008. The disclosures of said applications are incorporated by reference herein.

TECHNICAL FIELD

The present invention relates to a separator used for an electrochemical device such as a lithium secondary battery, a manufacturing method of the same, and an electrochemical device having the same. More particularly, the present invention relates to a separator in which a porous coating layer made of a mixture of a binder polymer and inorganic particles is formed on at least one surface of a non-woven fabric substrate, a manufacturing method thereof, and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, in the development of such batteries, designs of new electrodes and batteries to improve capacity density and specific energy are mainly studied.

Among currently used secondary batteries, lithium secondary batteries developed in early 1990's have a higher drive voltage and a much higher energy density than those of conventional batteries using a liquid electrolyte such as Ni—MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity in comparison to the lithium ion batteries, and its discharging capacity is insufficient at low temperature. Thus, it is urgent to solve these disadvantages of the lithium-ion polymer batteries.

Such electrochemical devices have been produced from many companies, and battery safety characteristics are different in the electrochemical devices. Accordingly, it is important to evaluate and ensure the safety of the electrochemical batteries. First of all, malfunction of the electrochemical device should not cause any damage to users. For this purpose, the Safety Regulation strictly regulates ignition and explosion in the electrochemical devices. In the safety characteristics of the electrochemical device, overheating of the electrochemical device may cause thermal runaway, and explosion may occur when a separator is pierced. In particular, a polyolefin-based porous substrate commonly used as a separator of an electrochemical device shows extreme thermal shrinking behavior at a temperature of 100° C. or above due to its inherent characteristics and its manufacturing processes such as elongation, which may cause an electric short circuit between positive and negative electrodes.

In order to solve the above safety-related problems of the electrochemical device, there has been supposed a separator having a porous coating layer formed by coating at least one surface of a porous substrate having a plurality of pores with a mixture of inorganic particles and a binder polymer. For example, Korean Patent Laid-open Patent Publication No. 2007-0019958, Japanese Patent Publication No. 2005-536857, and Japanese Laid-open Patent Publication No. 1999-080395 disclose techniques relating to a separator in which a porous coating layer made of a mixture of inorganic particles and a binder polymer is provided on a porous substrate.

In the separator having the porous coating layer as mentioned above, if a non-woven fabric is used as the porous substrate, a leak current may be generated to deteriorate insulation of the separator. If a loading weight of the porous coating layer is increased in order to prevent the generation of leak current, the thickness of the separator is increased, which is not suitable for implementing a high-capacity battery.

Thus, there is a need to optimally design the non-woven fabric substrate having a porous coating layer so that the generation of leak current may be prevented without increasing a loading weight of the porous coating layer.

SUMMARY OF THE INVENTION

Therefore, an aspect of the invention is to provide a separator capable of preventing the generation of leak current without increasing a loading weight of a porous coating layer by optimally designing a non-woven fabric substrate having the porous coating layer, and a manufacturing method of the same.

Another aspect of the present invention is to provide a high-capacity electrochemical device having the above separator.

In one aspect of the present invention, there is provided a separator, which includes a planar non-woven fabric substrate having a plurality of pores; and a porous coating layer provided on at least one surface of the non-woven fabric substrate and made of a mixture of a plurality of inorganic particles and a binder polymer, wherein the non-woven fabric substrate is made of superfine fibers having an average thickness of 0.5 to 10 μm (micrometer), and wherein, among the pores in the non-woven fabric substrate, pores having a wide diameter of 0.1 to 70 μm are 50% or above of the entire pores.

In the separator according to the present invention, the non-woven fabric substrate preferably has a thickness of 9 to 30. Also, a loading weight of the porous coating layer with respect to the non-woven fabric substrate is preferably 5 to 20 g/m².

The above separator is produced by preparing a planar non-woven fabric substrate made of superfine fibers having an average thickness of 0.5 to 10 μm (micrometer) and having pores among which pores having a wide diameter of 0.1 to 70 μm are 50% or above of the entire pores; and coating at least one surface of the non-woven fabric substrate with a binder polymer solution in which inorganic particles are dispersed, and drying the surface of the non-woven fabric substrate.

The separator as mentioned above according to the present invention may be used for electrochemical devices such as lithium secondary batteries and super capacitors while being interposed between a cathode and an anode.

The separator according to the present invention may suppress a short circuit between a cathode and an anode by inorganic particles present in a porous coating layer even though an electrochemical device is overheated. Also, since a non-woven fabric substrate having a controlled pore size using superfine fibers of a predetermined thickness is used, it is possible to prevent the generation of leak current without increasing a loading weight of the porous coating layer.

Thus, an electrochemical device having such a separator may have excellent thermal stability and high capacity.

DETAILED DESCRIPTION

Figure 1:
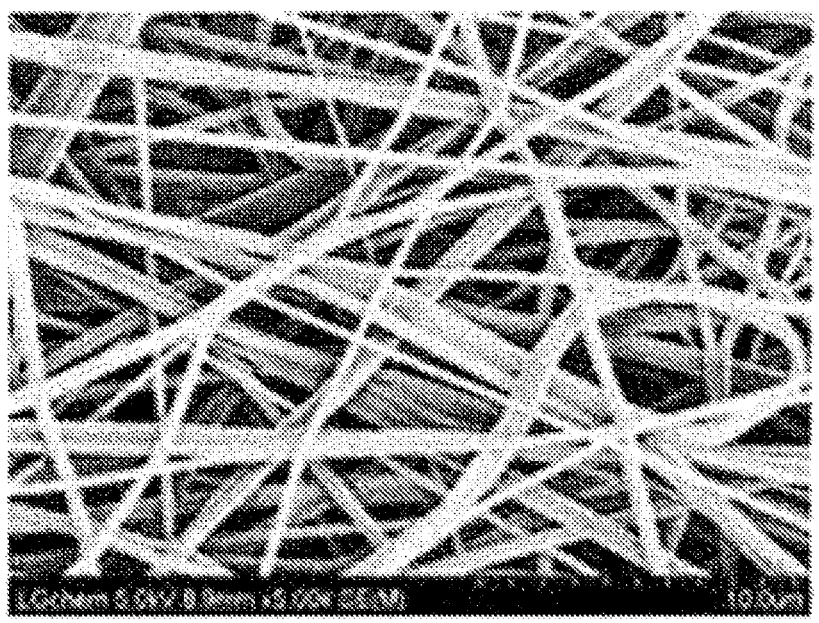
FIG. 1 is an SEM (Scanning Electron Microscope) photograph showing a non-woven fabric substrate employed in an example 1 of the present invention.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A separator according to the present invention includes a planar non-woven fabric substrate having a plurality of pores. The non-woven fabric is made of superfine fibers having an average thickness of 0.5 to 10 μm, preferably 1 to 7 μm. If the average thickness of superfine fibers is less than 0.5 μm, it is not easy to produce a non-woven fabric, and the produced non-woven fabric has deteriorated mechanical properties. Also, if the average thickness of superfine fibers is greater than 10 μm, it is not easy to control the size of pores in the non-woven fabric, and thus pores sized and distributed as described below are not easily formed.

Also, in the non-woven fabric, pores having a wide diameter (or, a longest diameter) of 0.1 to 70 μm are 50% or above based on the entire pores. A non-woven fabric mainly having pores of a wide diameter less than 0.1 μm is not easily produced, and thus the porosity of the non-woven fabric is deteriorated, which may partially disturb smooth movement of lithium ions. If the wide diameter of pores is greater than 70 μm, the insulation may be deteriorated due to a leak current. If a loading weight of the porous coating layer is increased in order to prevent the generation of leak current, the separator becomes thicker, so it is not easy to implement a high-capacity battery.

Only when pores of the above size occupy 50% or more of the entire pores, the object of the present invention can be accomplished by optimally designing the configuration and pore size of the non-woven fabric.

The superfine fibers of the non-woven fabric substrate may be made of polyolefin such as polyethylene and polypropylene, polyester such as polyethyleneterephthalate and polybutyleneterephthalate, polyamide such as aramid, polyacetal, polycarbonate, polyimide, polyetheretherketone, polyethersulfone, polyphenylene oxide, polyphenylene sulfide, polyethylene naphthalene, or the like, but not limitedly. In particular, in order to improve thermal stability of the non-woven fabric substrate, the superfine fibers preferably have a melt temperature of 200° C. or above. The non-woven fabric substrate also preferably has a thickness of 9 to 30 μm.

In the separator of the present invention, a porous coating layer is provided to at least one surface of the non-woven fabric substrate. The porous coating layer is made of a mixture of a plurality of inorganic particles and a binder polymer. The plurality of inorganic particles are connected with each other by means of the binder polymer, and pores are formed among the inorganic particles. A loading weight of the porous coating layer with respect to the non-woven fabric substrate is preferably 5 to 20 g/m$^2$. If the loading weight is less than 5 g/m$^2$, a leak current may be generated. If the loading weight is greater than 20 g/m$^2$, the separator becomes thicker, which may be not suitable for a high-capacity battery.

In the separator of the present invention, the inorganic particles used for forming the porous coating layer are not specially limited if they are electrically and chemically stable. In other words, inorganic particles causing no oxidation or reduction reaction in an operating voltage range (for example, 0 to 5V based on Li/Li$^+$) of an electrochemical device may be used in the present invention. In particular, in a case where an inorganic particle with a high dielectric constant is used, it is possible to improve ion conductivity of the electrolyte since the high dielectric constant contributes to the increase of the degree of dissociation of electrolyte salt in a liquid electrolyte, for example lithium salt.

Due to the above reasons, it is preferred that the inorganic particles may include high-dielectric inorganic particles having a dielectric constant of 5 or above, preferably 10 or above. The inorganic particle having a dielectric constant of 5 or above may be for example $BaTiO_3$, $Pb(Zr,Ti)O_3$ (PZT), $Pb_{1-x}$ $La_xZr_{1-y}Ti_yO_3$ (PLZT), PB $(Mg_3Nb_{2/3})$ $O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or their mixtures, but not limitedly.

In addition, the inorganic particle may have lithium ion transferring capability, in other words the inorganic particle may have a function of carrying lithium ions without storing lithium though containing lithium atoms. The inorganic particle having the lithium ion transferring capability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$—$9Al_2O_3$—$38TiO_2$—$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$-$Li_2S$—$P_2S_5$, or their mixtures, but not limitedly.

In the separator according to the present invention, the size of inorganic particles in the porous coating layer is not specially limited, but the particle size is preferably in the range of 0.001 to 10 µm, if possible, in order to form a coating layer with a uniform thickness and ensure suitable porosity. If the particle size is less than 0.001 µm, a dispersing property of inorganic particles may be deteriorated. If the particle size is greater than 10 µm, the thickness of the porous coating layer is increased, and thus an excessively great pore size may increase the possibility of internal short circuit while a battery is charged or discharged.

In addition, the binder polymer may use any polymer commonly used for forming a porous coating layer on a non-woven fabric substrate in the related art. In particular, a binder polymer having a glass transition temperature ($T_g$) between −200° C. and 200° C. is preferably used because the mechanical properties such as flexibility and elasticity of a finally produced porous coating layer can be improved. This binder polymer plays a role of connecting the inorganic particles with each other or with the non-woven fabric substrate and stably fixing the inorganic particles.

Also, the binder polymer does not necessarily need to exhibit ionic conductivity. However, since the ionic conductivity of the binder polymer can further improve the performance of an electrochemical device, it is preferred that the binder polymer has a dielectric constant as high as possible. In practice, the degree of dissociation of salts in an electrolyte is dependent on the dielectric constant of a solvent used in the electrolyte. Therefore, a higher dielectric constant of the binder polymer can lead to a higher degree of dissociation of salts in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 $Mpa^{1/2}$, more preferably between 15 and 25 $Mpa^{1/2}$ and between 30 and 45 $Mpa^{1/2}$. Accordingly, a hydrophilic polymer having many polar groups is preferred as the binder polymer over a hydrophobic polymer such as a polyolefin. A solubility parameter less than 15 $Mpa^{1/2}$ or exceeding 45 $Mpa^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and so on.

A ratio of the inorganic particles to the binder polymer in the porous coating layer formed in the separator according to the present invention is preferably 50:50 to 99:1, more preferably from 70:30 to 95:5. If the ratio of the inorganic particles to the binder polymer is less than 50:50, the content of polymer is so great that the pore size and porosity of the porous coating layer may be decreased. If the content of inorganic particles exceeds 99 parts by weight, the peeling resistance of the porous coating layer may be weakened since the content of binder polymer is so small. The pore size and porosity of the porous coating layer are not specially limited, but the pore size is preferably 0.001 to 10 µm and the porosity is preferably 10 to 90%. The pore size and porosity are mainly dependent on the size of inorganic particles. For example, in a case where inorganic particles have a diameter of 1 µm or less, the formed pores are also approximately 1 µm or less. The pores as mentioned above are filled with electrolyte injected later, and the filled electrolyte plays a role of transferring ions. In a case where the pore size and porosity are respectively less than 0.001 µm and 10%, the porous coating layer may act as a resistance layer. In a case where the pore size and porosity are respectively greater than 10 µm and 90%, mechanical properties may be deteriorated.

The separator of the present invention may further include other additives in addition to the inorganic particles and the binder polymer explained above as components of the porous coating layer.

A preferable example of a method for manufacturing the separator according to the present invention will be described below, but the present invention is not limited thereto.

First, a planar non-woven fabric substrate made of superfine fibers having an average thickness of 0.5 to 10 µm and having pores among which pores having a wide diameter of 0.1 to 70 µm are 50% or above of the entire pores is prepared. The non-woven fabric having the above configuration may be produced by controlling a diameter of a nozzle for spinning a superfine fiber and a spinning density.

Subsequently, at least one surface of the non-woven fabric substrate is coated with a binder polymer solution in which inorganic particles are dispersed, and then dried to make a separator.

The binder polymer solution in which inorganic particles are dispersed may be produced by dissolving a binder polymer in a solvent to prepare a binder polymer solution and then adding and dispersing inorganic particles thereto. The solvent preferably has a solubility parameter similar to that of the binder polymer and a low boiling point. It will help uniform mixture and easy removal of the solvent afterward. Non-limiting examples of usable solvents include acetone, tetrahydrofuran, methylene chloride, chloroform, dimethylformamide, N-methyl-2-pyrrolidone (NMP), cyclohexane, and water, or their mixtures. The inorganic particles are preferably pulverized after being added to the binder polymer solution. At this time, the time required for pulverization is suitably 1 to 20 hours, and the particle size of the pulverized particles is preferably 0.001 and 10 µm, as mentioned above. Conventional pulverization methods may be used, and ball milling is particularly preferred.

The binder polymer solution in which inorganic particles are dispersed is applied to the non-woven fabric substrate with a humidity of 10 to 80% as an example and then dried, and at this time any coating method well known in the art may be used. For example, various methods such as dip coating, die coating, roll coating, comma coating, or their combinations may be used. In addition, the porous coating layer may be formed on both surfaces of the non-woven fabric substrate or on any one surface thereof selectively. The porous coating layer formed according to the above coating method is present not only on the surface of the non-woven fabric substrate but also in the non-woven fabric substrate due to the inherent properties of the non-woven fabric substrate.

The separator prepared as mentioned above according to the present invention is interposed between a cathode and an anode to make an electrochemical device. At this time, in a case where a polymer that is gellable at swelling in liquid electrolyte is used as a binder polymer component, after a battery is assembled using the separator, the injected electrolyte and the binder polymer may be reacted and then gelated.

The electrochemical device of the present invention may be any device in which electrochemical reactions may occur, and specific examples of the electrochemical devices include all kinds of primary batteries, secondary batteries, fuel cells, solar cells, and capacitors such as a super capacitor. In particular, among the secondary batteries, lithium secondary batteries such as a lithium metal secondary battery, a lithium ion secondary battery, a lithium polymer secondary battery, and a lithium ion polymer secondary battery are preferred.

There is no special limitation in electrodes that may be used together with the separator of the present invention, and the electrode may be manufactured in a form that electrode active materials are united to electrode current collectors according to one of common methods well known in the art. Among the electrode active materials, cathode active material may adopt common cathode active material available for a cathode of conventional electrochemical devices. Particularly, the cathode active material preferably uses lithium manganese oxides, lithium cobalt oxides, lithium nickel oxides, lithium iron oxides, or lithium composite oxides thereof, not limitedly. Also, non-limiting examples of anode active materials are lithium intercalation materials such as lithium metal, lithium alloy, carbon, petroleum coke, activated carbon, graphite or other carbonaceous materials. Non-limiting examples of the cathode current collector include a foil made of aluminum, nickel, or combinations thereof, and non-limiting examples of the anode current collector include a foil made of copper, gold, nickel, copper alloys, or combinations thereof.

The electrolyte useable in the present invention includes a salt represented by the formula of $A^+B^-$, wherein $A^{30}$ represents an alkali metal cation such as $Li^+$, $Na^+$, $K^+$ or their combinations, and $B^-$ represents an salt containing an anion such as $PF_6^-$, $BF_4^-$, $Cl^-$, $Br_-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or their combinations. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures, but the electrolyte useable in the present invention is not limited to the above examples.

The electrolyte may be injected at a suitable step during the manufacturing process of a battery, according to the manufacturing process and desired properties of a final product. In other words, the electrolyte may be injected before a battery is assembled, during a final step of the assembly process of a battery, or the like.

To apply the separator of the present invention to a battery, a folding process and a laminating or stacking process of the separator and the electrode may be used in addition to a general winding process.

EXAMPLES

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Example 1

Preparation of Separator

Figure 2:
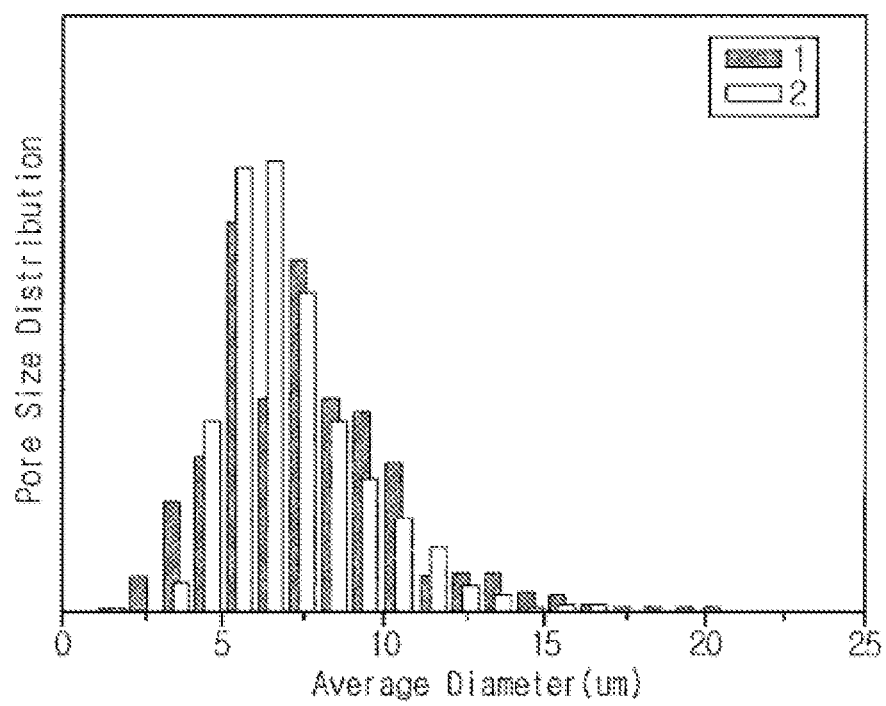
FIG. 2 is a graph showing size distribution of pores formed in the non-woven fabric substrate of FIG. 1.

PVdF-CTFE (polyvinylidene fluoride-chlorotrifluoroethylene) copolymer and cyanoethyl pullulan were respectively added to acetone at a weight ratio of 10:2 and dissolved at 50° C. for about 12 hours to produce a polymer solution. $BaTiO_3$ powder was added to the produced binder polymer solution so that a weight ratio of the binder polymer to $BaTiO_3$ is 10:90, and then $BaTiO_3$ powder was pulverized and dispersed by ball milling for 12 hours or more to produce slurry. In the produced slurry, the diameter of $BaTiO_3$ may be controlled in accordance with the size (diameter) of beads used for the ball milling or the time taken for the ball milling, but the $BaTiO_3$ powder was pulverized into about 400 nm into slurry in the example 1 of the present invention. The slurry produced as mentioned above was applied to a polyethylene terephthalate non-woven fabric with a thickness of 12 μm by dip coating while varying a loading weight thereof. The used non-woven fabric was made of superfine fibers having an average thickness of about 3 μm (see FIG. 1), and pores in the non-woven fabric entirely had a wide diameter less than 70 μm as shown in FIG. 2. In the present invention, the average thickness of superfine fibers of the non-woven fabric was measured by using an SEM photograph, and the wide diameter of pores and the pore distribution were measured in accordance with ASTM F316.

Figure 3:
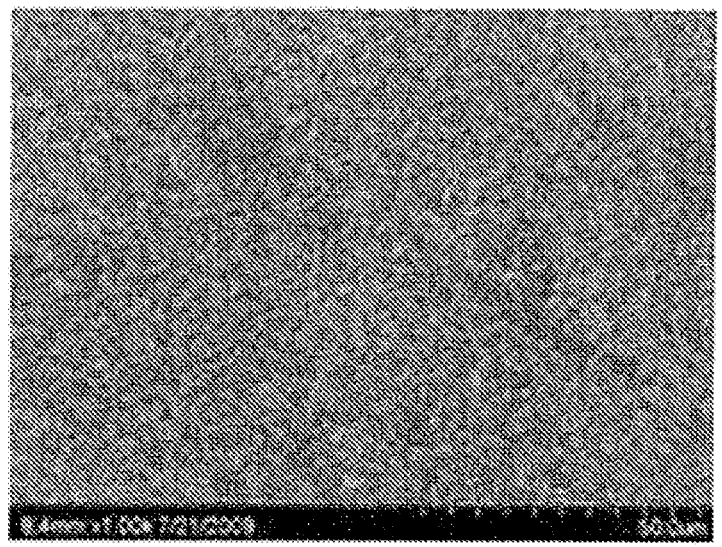
FIG. 3 is an SEM photograph showing the surface of a separator formed according to the example 1 of the present invention.

FIG. 3 shows a photograph of the surface of a produced separator.

Preparation of Anode 96 weight of carbon powder serving as anode active material, 3 weight % of polyvinylidene fluoride (PVdF) serving as a binding agent, and 1 weight % of carbon black serving as a conductive material were added to N-methyl-2-pyrrolidone (NMP) serving as a solvent to produce an anode mixture slurry. The anode mixture slurry was applied to a copper (Cu) film with a thickness of 10 μm serving as an anode current collector and then dried to produce an anode, and then the anode was roll-pressed.

Preparation of Cathode 92 weight % of lithium cobalt composite oxide serving as cathode active material, 4 weight % of carbon black serving as a conductive material, and 4 weight % of polyvinylidene fluoride (PVdF) serving as a binding agent, were added to N-methyl-2-pyrrolidone (NMP) serving as a solvent to produce a cathode mixture slurry. The cathode mixture slurry was applied to an aluminum (Al) film with a thickness of 20 μm serving as a cathode current collector and then dried to produce a cathode, and then the cathode was roll-pressed.

Preparation of Battery

The prepared electrodes and separator was used to produce a battery.

The produced battery was assembled by stacking the cathode, the anode, and the porous organic/inorganic composite separator, and an electrolyte (ethylene carbonate (EC)/ethylmethyl carbonate (EMC)=½ (volume ratio), 1 mole of lithium hexafluorophosphate (LiPF$_6$)) was injected therein.

Comparative Example 1

Figure 4:
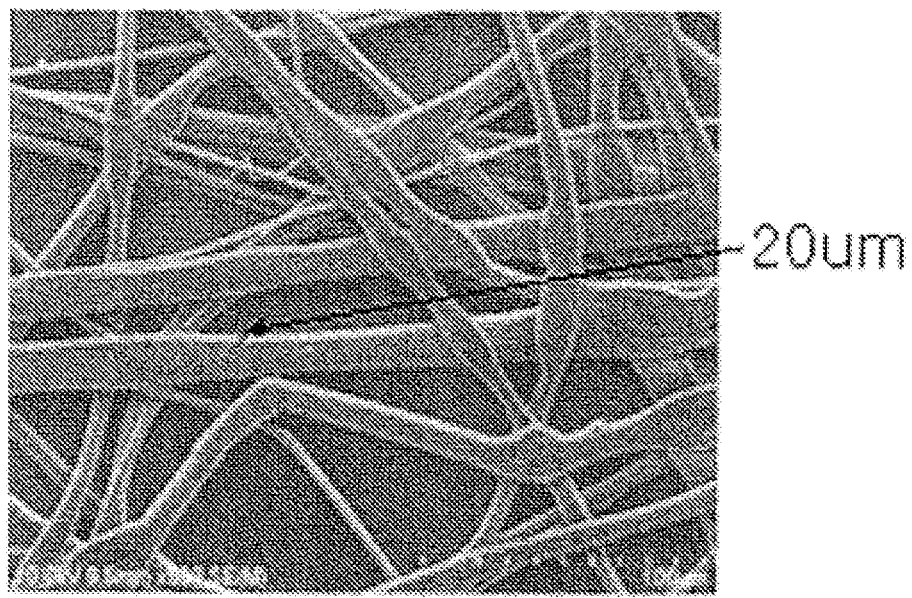
FIG. 4 is an SEM photograph showing a non-woven fabric substrate used in a comparative example 1.
Figure 5:
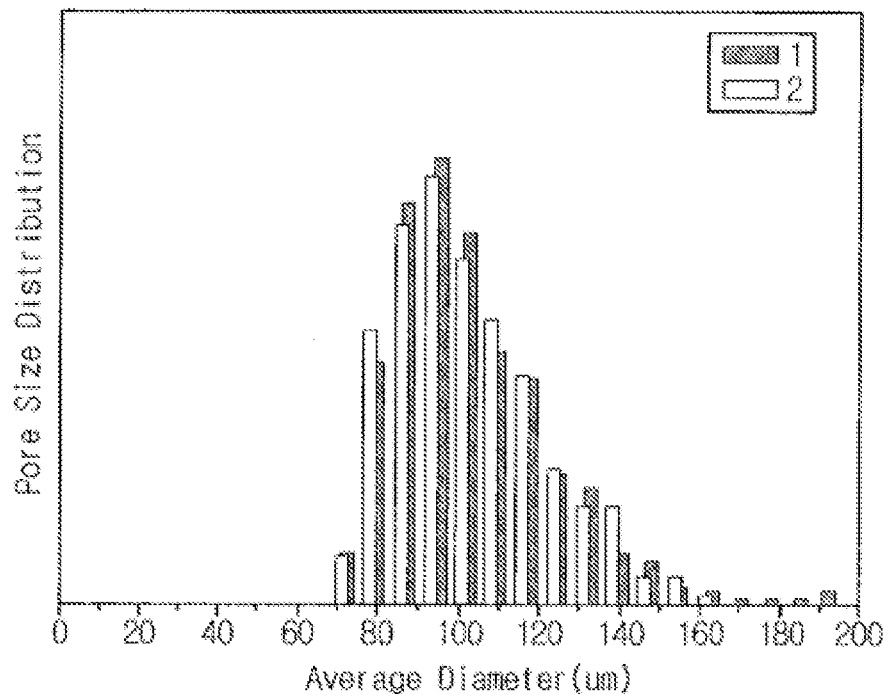
FIG. 5 is graph showing size distribution of pores formed in the non-woven fabric substrate of FIG. 4.

As shown in FIGS. 4 and 5, a battery was produced in the same way as the example 1, except that the non-woven fabric substrate was made of superfine fibers having an average thickness of about 20 μm and included pores having a wide diameter greater than 70 μm entirely.

Comparative Example 2

Figure 6:
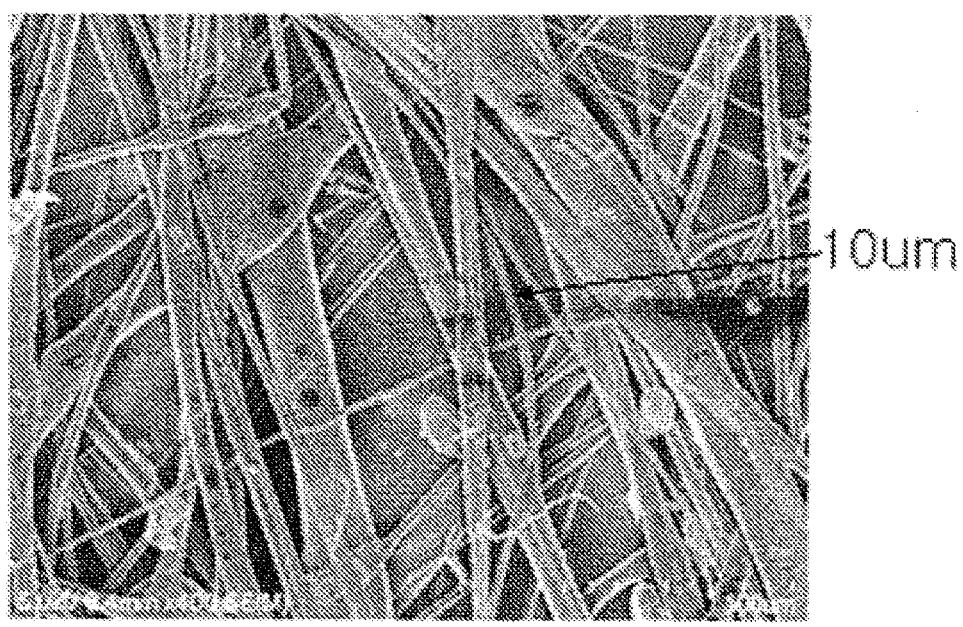
FIG. 6 is an SEM photograph showing a non-woven fabric substrate used in a comparative example 2.
Figure 7:
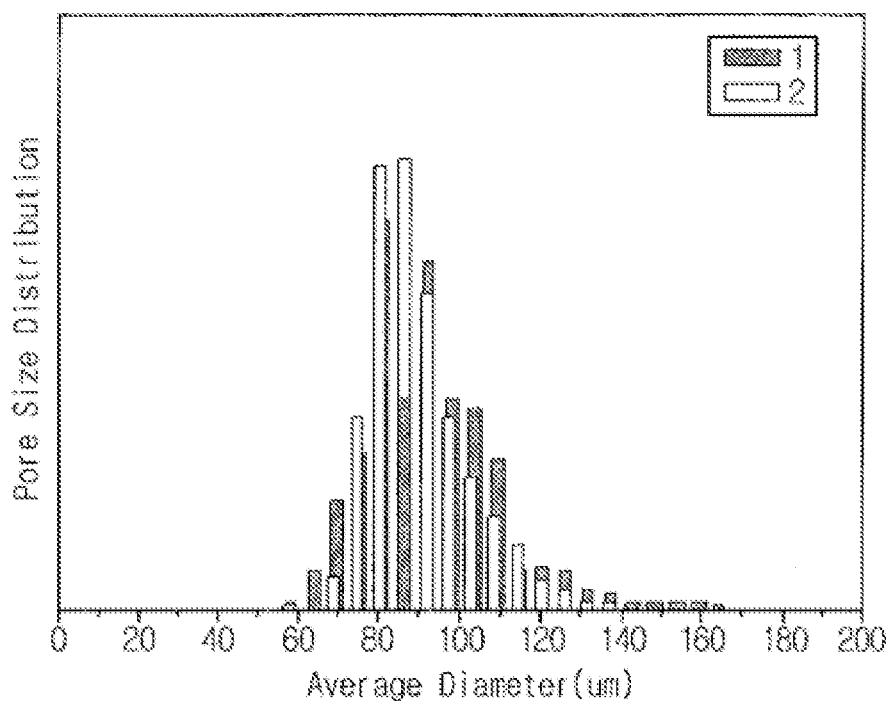
FIG. 7 is graph showing size distribution of pores formed in the non-woven fabric substrate of FIG. 6.

As shown in FIGS. 6 and 7, a battery was produced in the same way as the example 1, except that the non-woven fabric substrate was made of superfine fibers having an average thickness of about 10 μm and in which about 10% of the pores included therein has a wide diameter smaller than 70 μm.

A charging/discharging test was performed to the produced batteries. The test results are shown in the following table 1.

TABLE 1

| | Loading weight of porous coating layer | | |
|---|---|---|---|
| | 0 g/m$^2$ | 5~20 g/m$^2$ | >20 g/m$^2$ |
| Example 1 | Leak current generated | Charge/discharge Pass | Charge/discharge Pass |
| Comparative example 1 | Charge/discharge Fail | Leak current generated | Leak current generated |
| Comparative example 2 | Charge/discharge Fail | Leak current generated | Charge/discharge Pass |

Figure 8:
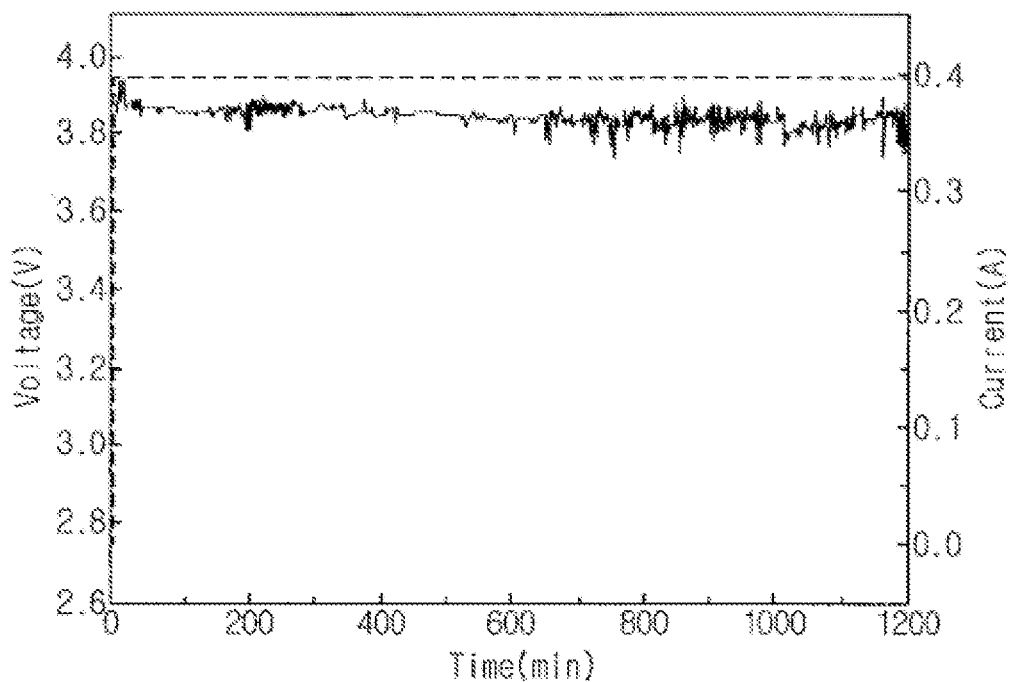
FIG. 8 is a charge/discharge fail profile of a battery in which a loading weight of a porous coating layer is 0 g/m$^2$ according to the comparative example 2.
Figure 9:
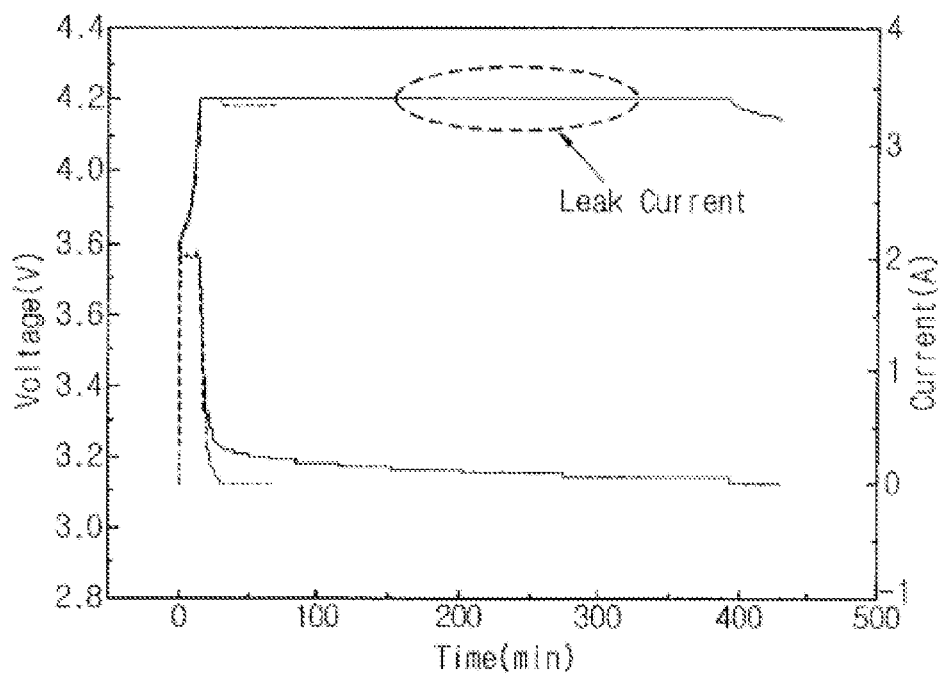
FIG. 9 is a leak current profile of a battery in which a loading weight of a porous coating layer exceeds 20 g/m$^2$ according to the comparative example 1.
Figure 10:
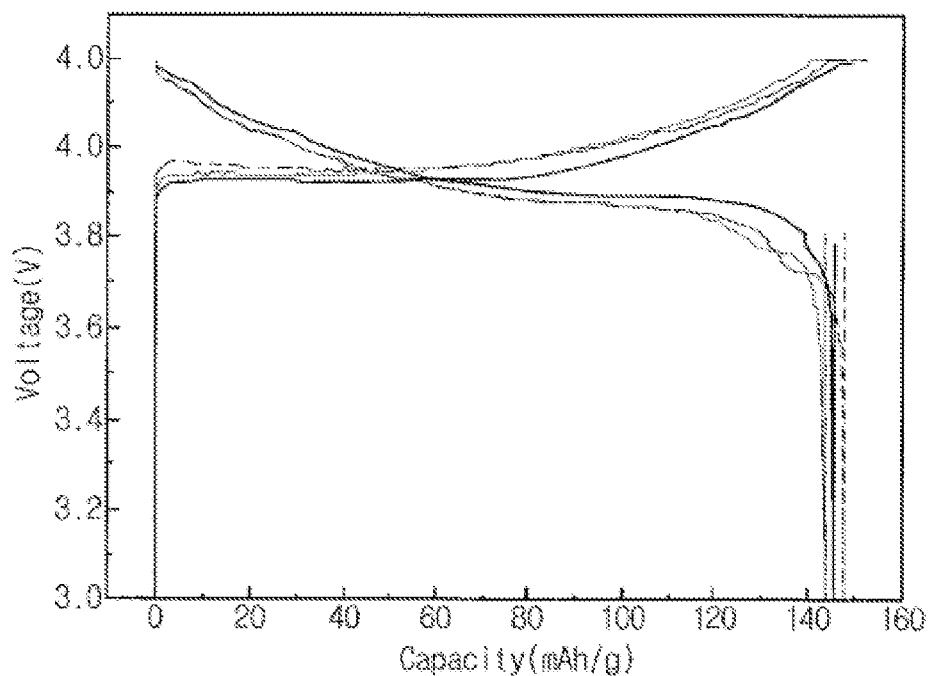
FIG. 10 is a charge/discharge pass profile of a battery in which a loading weight of a porous coating layer is in the range of 5 to 20 g/m$^2$ or exceeds 20 g/m$^2$ according to the example 1 of the present invention and a charge/discharge pass profile of a battery in which a loading weight of a porous coating layer exceeds 20 g/m$^2$ according to the comparative example 2.

FIG. 8 is a charge/discharge fail profile of the battery in which a loading weight of the porous coating layer is 0 g/m$^2$ according to the comparative example 2, and FIG. 9 is a leak current profile of the battery in which a loading weight of the porous coating layer exceeds 20 g/m$^2$ according to the comparative example 1. Meanwhile, FIG. 10 is a charge/discharge pass profile of the battery in which a loading weight of the porous coating layer is in the range of 5 to 20 g/m$^2$ or exceeds 20 g/m$^2$ according to the example 1 of the present invention and a charge/discharge pass profile of the battery in which a loading weight of a porous coating layer exceeds 20 g/m$^2$ according to the comparative example 2, together.

What is claimed is:

1. A separator comprising:
   (A) a planar non-woven fabric substrate having a plurality of fibers and pores; and
   (B) a porous coating layer provided on at least one surface of the non-woven fabric substrate and made of a mixture of a plurality of inorganic particles and a binder polymer, wherein:
   (1) the fibers of the non-woven fabric substrate consist of superfine fibers, the fibers having an average thickness of 0.5 to 10 μm;
   (2) among the distribution of pore size in the non-woven fabric substrate, pores having a wide diameter of 0.1 to 70 μm are 50% or above of the entire pores; and
   (3) a loading weight of the porous coating layer with respect to the non-woven fabric substrate is 5 to 20 g/m$^2$, which prevents leak current generation of the separator wherein the superfine fibers have a melt temperature of 200° C. or above, and
   wherein the superfine fibers are made of any polymer selected from the group consisting of polyester, polyacetal, polycarbonate, polyimide, polyetheretherketone, polyethersulfone, polyphenylene oxide, polyphenylene sulfide, polyethylene naphthalene and mixtures thereof.

2. The separator of claim 1, wherein the average thickness of the superfine fibers is 1 to 7 μm.

3. The separator of claim 1, wherein the non-woven fabric substrate has a thickness of 9 to 30 μm.

4. The separator of claim 1, wherein a weight ratio of the inorganic particles to the binder polymer is 50:50 to 99:1.

5. The separator of claim 1, wherein the inorganic particles have a size of 0.001 to 10 μm.

6. The separator of claim 1, wherein the binder polymer has a solubility parameter of 15 to 45 Mpa$^{1/2}$.

7. The separator of claim 1, wherein the binder polymer is any binder polymer selected from the group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, and their mixtures.

8. A method for manufacturing a separator, comprising:
   (A) preparing a planar non-woven fabric substrate having a plurality of fibers, the fibers consist of superfine fibers, the fibers having an average thickness of 0.5 to 10 μm and having a distribution of pore sizes among which pores having a wide diameter of 0.1 to 70 μm are 50% or above of the entire pores; and
   (B) coating at least one surface of the non-woven fabric substrate with a binder polymer solution in which inorganic particles are dispersed, and drying the surface of the non-woven fabric substrate;
   wherein a loading weight of the inorganic particles and the binder polymer with respect to the non-woven fabric substrate is controlled in the range of 5 to 20 g/m$^2$,
   wherein the superfine fibers have a melt temperature of 200° C. or above, and
   wherein the superfine fibers are made of any polymer selected from the group consisting of polyester, polyacetal, polycarbonate, polyimide, polyetheretherketone, polyethersulfone, polyphenylene oxide, polyphenylene sulfide, polyethylene naphthalene and mixtures thereof.

9. The method of claim 8, wherein, in the binder polymer solution in which inorganic particles are dispersed, a weight ratio of the inorganic particles to the binder polymer is controlled into the range of 50:50 to 99:1.

10. An electrochemical device comprising a cathode, an anode, and a separator interposed between the cathode and the anode,
   wherein the separator is the separator of claim 1.

11. The electrochemical device according to claim 10, wherein the electrochemical device is a lithium secondary battery.

12. A separator comprising:
   (A) a planar non-woven fabric substrate having a plurality of fibers and pores; and
   (B) a porous coating layer provided on at least one surface of the non-woven fabric substrate and made of a mixture of a plurality of inorganic particles and a binder polymer, wherein:

(1) the fibers of the non-woven fabric substrate consist of superfine fibers, the fibers having an average thickness of 0.5 to 10 μm;
(2) among the distribution of pore size in the non-woven fabric substrate, pores having a wide diameter of 0.1 to 70 μm are 50% or above of the entire pores; and
(3) a loading weight of the porous coating layer with respect to the non-woven fabric substrate is 5 to 20 g/m$^2$,
wherein the superfine fibers have a melt temperature of 200° C. or above, and
wherein the superfine fibers are made of any polymer selected from the group consisting of polyester, polyacetal, polycarbonate, polyimide, polyetheretherketone, polyethersulfone, polyphenylene oxide, polyphenylene sulfide, polyethylene naphthalene and mixtures thereof.

* * * * *